(No Model.) 2 Sheets—Sheet 1.
J. J. WOOD.
CONNECTION BETWEEN SEPARATELY EXCITED DYNAMOS AND THEIR EXCITERS.
No. 512,425. Patented Jan. 9, 1894.
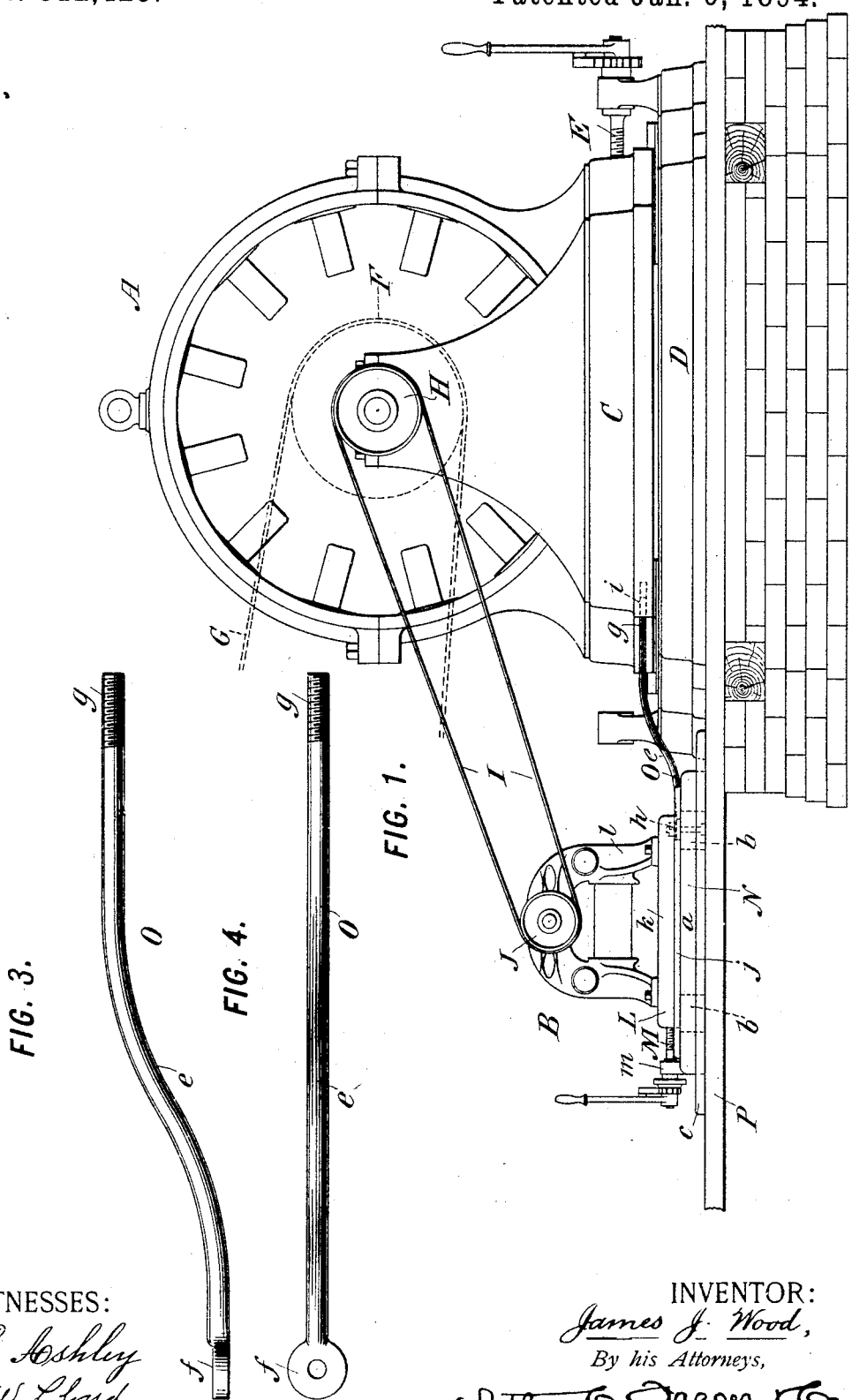
WITNESSES:
C. E. Ashley
H. W. Lloyd
INVENTOR:
James J. Wood,
By his Attorneys,
Arthur C. Fraser & Co.

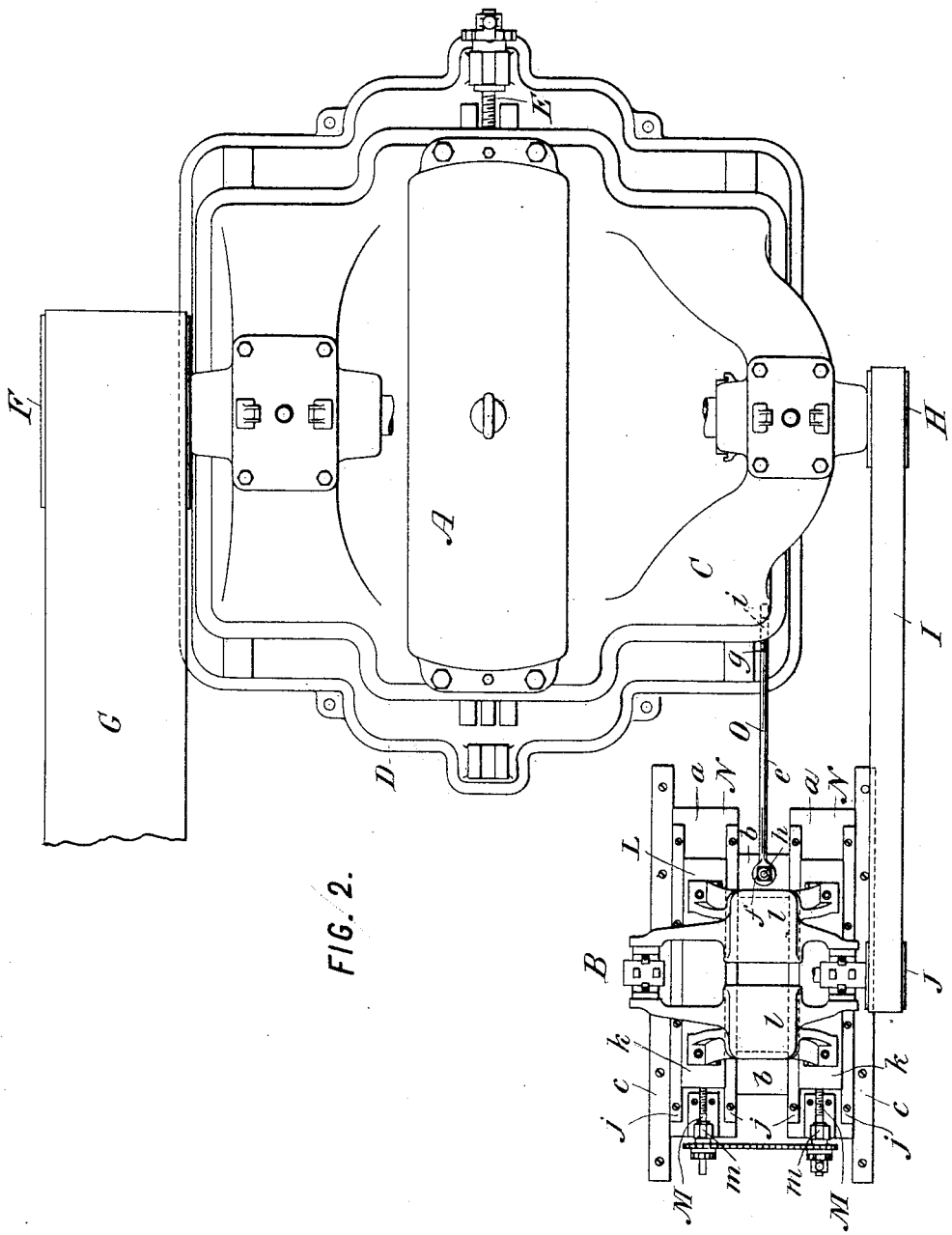

UNITED STATES PATENT OFFICE.

JAMES J. WOOD, OF FORT WAYNE, INDIANA.

CONNECTION BETWEEN SEPARATELY-EXCITED DYNAMOS AND THEIR EXCITERS.

SPECIFICATION forming part of Letters Patent No. 512,425, dated January 9, 1894.

Application filed October 17, 1893. Serial No. 488,422. (No model.)

*To all whom it may concern:*

Be it known that I, JAMES J. WOOD, a citizen of the United States, residing in Fort Wayne, in the county of Allen and State of Indiana, have invented certain new and useful Improvements in Connections Between Separately-Excited Dynamos and their Exciters, of which the following is a specification.

This invention relates to the connection between a separately excited dynamo and the exciter therefor, and is designed to provide a new method of effecting such connection which shall be more advantageous than the modes heretofore employed.

Heretofore "alternators" and other separately excited dynamos have generally been connected with their exciters either by mounting both on the same base, or by mounting each on a separate adjustable base. The first of these constructions has been advantageous in that it preserved a uniform distance between the exciter and alternator, whereby any adjustment of the latter to tighten its main driving belt has not interfered with the length or tension of the auxiliary belt used to run the exciter; but this arrangement has been subject to the disadvantage that any leak in the main circuit of the alternator tends to cause a leak in the circuit of the exciter, since the two are mounted on the same base. The second of these constructions has been disadvantageous in that great difficulty attended the adjustment of the alternator to preserve the tension of its driving belt, for the reason that in order to keep the belt of the exciter at the proper tension during and after such adjustment, it has been necessary to simultaneously move both the alternator and the exciter. This has been difficult as well as inconvenient to accomplish, and has required the simultaneous effort of two men.

According to my invention I mount the alternator as usual with its surbase adjustably carried by the usual fixed base, and I mount the exciter on a compound base consisting of a movable base and an adjustable surbase carried thereby and carrying the exciter, and between the surbase of the alternator and the movable base of the exciter I provide a rigid connection causing the latter to follow all the movements of the former. Preferably this connection is an insulated connection, whereby any leak in the alternator cannot affect the operation of the exciter. In this manner the exciter with its adjustable surbase can be adjusted on its movable base relatively to the alternator until the proper tension is obtained for its driving belt, and thereafter by reason of the connection between the exciter and alternator, the adjustment thus obtained will be preserved throughout all adjustments of the alternator necessary to the proper tension of its driving belt. Thus in adjusting the alternator it will be only necessary for one person to manipulate the latter, since the exciter will follow all its movements. By this arrangement the exciter can be disposed at a sufficient distance from the alternator to give the advantages of a long belt between the two, an arrangement which could not be conveniently accomplished if both were mounted on the one base, since the unusual extension of such a base would be both inconvenient and expensive.

In the accompanying drawings, which show the preferred adaptation of my invention, Figure 1 is a side elevation of a separately excited dynamo and its exciter connected according to my invention. Fig. 2 is a plan view thereof. Fig. 3 is an enlarged side elevation of the connecting bar between the alternator and exciter; and Fig. 4 is a plan view thereof.

Referring to the drawings, let A indicate a separately excited dynamo, and B the exciter thereof. The dynamo A may be of any known or suitable construction, that shown representing an alternating current dynamo of a well known construction, having a surbase C mounted adjustably on a fixed base D, adjusted thereon by the usual adjusting screw E, and having on one end of its armature shaft the driving belt-pulley F carrying its main driving belt G, and on the other end of its driving shaft the exciter belt-pulley H carrying the exciter belt I. The exciter B may be any suitable construction of dynamo, that shown having on its armature shaft a belt-pulley J carrying its driving belt I, whereby it is driven from the alternator A. As shown, the exciter B is fixedly mounted on an adjustable surbase L, adjusted by the usual adjusting screw M, whereby it can be moved toward or from the alternator to obtain the requisite tension on its driving belt I. As thus far described the parts are of usual and known construction.

According to my invention I rigidly connect the alternator and exciter together. This is preferably accomplished by mounting the adjustable surbase L of the exciter adjustably on a sliding exciter base N, and providing a rigid connection O between the adjustable surbase C of the alternator and the sliding base N of the exciter. In the preferred details of construction, the sliding base N is a rectangular wooden frame consisting of longitudinal beams $a$ coupled together by cross-beams $b$, and sliding on the floor or other suitable support P between longitudinal tracks $c$ $c$ disposed parallel with the direction of adjustment of the alternator A. The connection O is preferably a cylindrical metallic rod $e$ having at its exciter end a bolt-eye $f$, and at its alternator end a male screw-thread $g$. At its exciter end it is preferably fastened to the sliding base N by a bolt $h$ traversing its bolt-eye and entering the adjacent wooden cross-piece $b$ of the frame N, whereby an insulated joint is obtained between the exciter and the connection O. At its opposite end its screwthread $g$ is screwed into a screw-threaded aperture $i$ in the adjustable surbase C of the alternator, whereby when the bar $e$ is freed from the sliding base of the exciter it can be screwed inwardly or outwardly relatively to the surbase C, and thereby its extent of projection from the latter can be adjusted to suit the circumstances of its use. On the top face of each beam $a$ are arranged longitudinal tracks $j\,j$, and between these are mounted the two wooden beams $k\,k$ of the adjustable surbase L of the exciter. To these beams the frame $l$ of the exciter is rigidly fixed. The adjusting screws M engage the beams $k\,k$, and are carried by collars $m$ fixed to the beams $a$, whereby when the screws are operated the exciter and its surbase can be adjusted longitudinally on its sliding base N, and thereby, as the latter is rigidly fixed relatively to the alternator, the tension of the belt of the exciter can be adjusted to the proper degree, and this adjustment will be preserved, since the exciter must follow the movements of its sliding base N, and the latter must follow the movements of the alternator.

In operation, the bar $e$ is properly adjusted by screwing it into the surbase C of the alternator. The sliding base N of the exciter is then connected to the bar by the bolt $h$, and the exciter is then adjusted on its sliding base until the requisite tension of the belt I is obtained. The alternator can then be adjusted as desired to preserve the tension of its main driving belt, and during such adjustment all its movements will be followed by the exciter, whereby the tension of the belt of the latter will not be impaired.

It will be seen that my invention provides an improved connection for the exciters of alternating current dynamos which is simple of construction, convenient and effective of operation, and which can be variously availed of, and it will be understood that the invention is not limited to the exact details of construction and operation set forth as constituting its preferred form, as these may be modified in such respects as circumstances, or the judgment of those skilled in the art, may dictate, without departing from the essential features of the invention.

What I claim is, in connections for separately-exciting dynamos and their exciters, the following-defined novel features and combinations, substantially as hereinbefore set forth, namely:

1. The combination with a separately excited dynamo having an adjustably mounted surbase, of an exciter for said dynamo adjustably mounted on a movable base, and a rigid connection between the surbase of said separately excited dynamo and the movable base of said exciter, whereby the latter follows the movements of the former and the tension of the driving belt between the two is preserved.

2. The combination with a separately excited dynamo having an adjustably mounted surbase, of an exciter for said dynamo adjustably mounted on a movable base, and an insulated rigid connection between the surbase of said separately excited dynamo and the movable base of said exciter, whereby the latter follows the movements of the former and the tension of the driving belt between the two is preserved, and a leak at the dynamo will not affect the operation of said exciter.

3. The combination with a separately excited dynamo A having an adjustable surbase C, of an exciter B, an adjustable surbase L fixed to said exciter, a driving belt I between said dynamo and exciter for driving the latter from the former, the tension of which belt is controlled by the adjustment of the surbase of said exciter, a sliding base N on which said surbase L is adjustably mounted, and a connection O between said sliding base and said surbase C, and maintaining the relative position of said parts.

In witness whereof I have hereunto signed my name in the presence of two subscribing witnesses.

JAMES J. WOOD.

Witnesses:
 ISIDORE BIRKNER,
 KITTIE STEINBRUNNER.